(12) United States Patent
Yuan (10) Patent No.: US 11,210,256 B2
(45) Date of Patent: Dec. 28, 2021

(54) METHOD AND APPARATUS FOR SCENE PERCEPTION AND SERVICE PROVISION

(71) Applicant: BANMA ZHIXING NETWORK (HONGKONG) CO., LIMITED, Kowloon (HK)

(72) Inventor: Zhijun Yuan, Hangzhou (CN)

(73) Assignee: BANMA ZHIXING NETWORK (HONGKONG) CO., LIMITED, Hong Kong (HK)

(*) Notice: Subject to any disclaimer, the term of this patent is extended or adjusted under 35 U.S.C. 154(b) by 0 days.

(21) Appl. No.: 16/000,663

(22) Filed: Jun. 5, 2018

(65) Prior Publication Data

US 2018/0341618 A1 Nov. 29, 2018

Related U.S. Application Data

(63) Continuation-in-part of application No. PCT/CN2016/107405, filed on Nov. 28, 2016.

(30) Foreign Application Priority Data

Dec. 8, 2015 (CN) .......................... 201510897453.3

(51) Int. Cl.
*G06F 13/42* (2006.01)
*G06F 13/00* (2006.01)
*H04L 29/08* (2006.01)
*H04W 4/06* (2009.01)

(52) U.S. Cl.
CPC .............. *G06F 13/42* (2013.01); *H04L 67/22* (2013.01); *H04L 67/18* (2013.01); *H04W 4/06* (2013.01)

(58) Field of Classification Search
CPC .................................. G06F 13/00; G06F 13/42
USPC .......................................................... 710/14
See application file for complete search history.

(56) References Cited

U.S. PATENT DOCUMENTS

| | | | |
|---|---|---|---|
| 7,395,507 B2 | 7/2008 | Robarts | |
| 7,539,747 B2 | 5/2009 | Lucovsky | |
| 7,613,842 B2* | 11/2009 | Kong | G06F 3/0238 710/8 |
| 7,680,849 B2* | 3/2010 | Heller | G06F 16/258 707/621 |
| 9,959,437 B1* | 5/2018 | Ramos | G06Q 30/0623 |
| 2003/0028390 A1 | 2/2003 | Stern | |
| 2006/0224742 A1* | 10/2006 | Shahbazi | H04W 12/0027 709/226 |

(Continued)

FOREIGN PATENT DOCUMENTS

| CN | 102891786 A | 1/2013 |
|---|---|---|
| CN | 104202728 A | 12/2014 |

(Continued)

*Primary Examiner* — Christopher B Shin
(74) *Attorney, Agent, or Firm* — Van Pelt, Yi & James LLP (57) ABSTRACT

Embodiments of the present application relate to a method, device, and system for context awareness and providing a service. The method includes connecting, by a terminal, to a peripheral, obtaining, by the terminal, information corresponding to the peripheral, determining, by the terminal, context information based on the information corresponding to the peripheral and a connection status of a connection between the terminal and the peripheral, and performing, by the terminal, one or more operations based at least in part on the context information.

24 Claims, 6 Drawing Sheets

(56) References Cited

U.S. PATENT DOCUMENTS

| | | | |
|---|---|---|---|
| 2008/0143489 A1* | 6/2008 | Castaldo | G06F 9/54 340/286.01 |
| 2010/0081375 A1* | 4/2010 | Rosenblatt | H04L 12/2814 455/41.1 |
| 2010/0235546 A1 | 9/2010 | Terlizzi | |
| 2011/0065451 A1 | 3/2011 | Danado | |
| 2011/0264245 A1* | 10/2011 | Lim | H04L 12/12 700/90 |
| 2012/0218088 A1* | 8/2012 | Bauchot | G08C 21/00 340/10.41 |
| 2014/0373123 A1* | 12/2014 | Kang | H04L 41/22 726/7 |
| 2015/0099467 A1* | 4/2015 | Kang | H04W 52/0229 455/41.2 |
| 2015/0182160 A1* | 7/2015 | Kim | A61B 5/0488 600/301 |
| 2015/0223145 A1* | 8/2015 | Yoon | H04W 48/04 370/328 |
| 2016/0004224 A1* | 1/2016 | Pi | G04G 21/025 368/10 |
| 2016/0132588 A1* | 5/2016 | Duncan | G06F 16/288 235/462.01 |
| 2016/0164694 A1* | 6/2016 | Hyun | H04L 12/12 348/14.08 |
| 2016/0307012 A1* | 10/2016 | Narasimha | H04B 5/0062 |
| 2017/0078962 A1* | 3/2017 | Hassan | H04W 76/10 |
| 2017/0105222 A1* | 4/2017 | Nieman | H04W 76/14 |
| 2017/0208364 A1* | 7/2017 | Glazier | H04N 21/41407 |
| 2017/0244574 A1* | 8/2017 | Moon | H04L 12/2809 |
| 2018/0108230 A1* | 4/2018 | Finnegan | H04M 11/025 |
| 2018/0109999 A1* | 4/2018 | Finnegan | H04L 12/4625 |
| 2018/0191685 A1* | 7/2018 | Bajoria | H04L 51/24 |
| 2018/0191695 A1* | 7/2018 | Lindemann | H04L 63/0853 |
| 2018/0220076 A1* | 8/2018 | Kamiya | H04N 5/23209 |
| 2018/0249519 A1* | 8/2018 | Hanes | H04W 8/005 |

FOREIGN PATENT DOCUMENTS

| | | |
|---|---|---|
| CN | 104580717 A | 4/2015 |
| CN | 102833855 A | 9/2015 |
| CN | 104950823 A | 9/2015 |
| CN | 103402259 A | 5/2016 |
| WO | 2016065812 A1 | 5/2016 |

\* cited by examiner

METHOD AND APPARATUS FOR SCENE PERCEPTION AND SERVICE PROVISION

CROSS REFERENCE TO OTHER APPLICATIONS

This application is a continuation-in-part of and claims priority to International (PCT) Application No. PCT/CN2016/107405 entitled METHOD AND APPARATUS FOR SCENE PERCEPTION AND SERVICE PROVISION, filed Nov. 28, 2016 which is incorporated herein by reference for all purposes, which claims priority to China Application No. 201510897453.3 entitled A CONTEXT AWARENESS AND SERVICE-PROVIDING METHOD AND MEANS, filed Dec. 8, 2015 which is incorporated herein by reference for all purposes.

FIELD OF THE INVENTION

The present application relates to smart technology. In particular, the present application relates to a context awareness and a method, apparatus, and system for providing services.

BACKGROUND OF THE INVENTION

As smart devices become increasingly commonplace, the smart devices that users operate connect with various kinds of smart peripherals, such as WiFi routers, Bluetooth car kits, smart television sets, and smart watches.

Users can use smart devices to connect to or disconnect from smart peripherals. A smart peripheral can include, a smart watch, a smart bracelet, a smart TV, a near field communication (NFC) label, etc. When the smart devices are connected to the smart peripherals, the smart devices can use the functions of the smart peripheral. For example, when a smart device is connected to a WiFi router, the smart device uses the network services that the WiFi router provides. As another example, when the smart device is connected to a smart TV, the smart device provides commands to the smart device such as to change the smart TV channels. As yet another example, when the smart device is connected to a smart watch, the smart device can be operated to modify a configuration of the smart watch or to obtain data monitored or collected by the smart watch.

A user generally uses smart peripherals depending on the specific context. If the smart peripheral could be aware of a current context of the user, then the user could be provided with more precise service.

Related art provides two mechanisms for context awareness. The first mechanism determines the current context based on a position determined via a Global Positioning System (GPS). The second mechanism determines the current context based on a position determined via electronic fences.

The use of GPS positioning technology in connection with determining a current context cannot precisely locate a user, especially when the user (or the smart device associated therewith) is indoors. Thus, the use of GPS in connection with determining the current context of a user does not accurately sense the current context of the user.

The current context of the user determined via electronic fences can use Bluetooth technology or other peripherals. For example, a user's position can be determined in connection with determining an electronic fence perimeter using Bluetooth or other peripherals. When a user passes through the electronic fence, the position of the user is determined, and the current context of the user is thus inferred. However, the use of electronic fence technology relies on an electronic fence being set up in advance. Accordingly, the use of electronic fence technology in connection with determining a current context of a user lacks universality and the range of applications is limited.

In view of the above, there is a need for a new context awareness scheme that overcomes the deficiencies described above.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a terminal generally refers to a device comprising one or more processors. A terminal can be a device used (e.g., by a user) within a network system and used to communicate with one or more servers. According to various embodiments of the present disclosure, a terminal includes components that support communication functionality. For example, a terminal can be a smart phone, a server, a machine of shared power banks, information centers (such as one or more services providing information such as traffic or weather, etc.), a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a kiosk such as a vending machine, a smart home appliance, vehicle-mounted mobile stations, or the like. A terminal can run various operating systems.

In some embodiments, a "smart terminal" is a terminal device having multimedia functions. A smart terminal supports audio, video, data, and other such functions. The smart terminal can have a touchscreen. The smart terminal can correspond to a smart mobile device such as a smart phone, a tablet computer, or a smart wearable device, or a smart television, personal computer, or other such device with a touchscreen. Various operating systems such as Android, iOS, YunOS, and tvOS can be implemented on the smart terminal. Various embodiments discussed herein are in the context of the example of a television device using tvOS; however, other types of terminals or operating systems can be used. A smart terminal can be connected to one or more networks such as the Internet, a WiFi network, a Local Area Network (LAN), a Wide Area Network (WAN), a telecommunications network, etc.

A smart terminal can be connected to one or more peripherals (e.g., smart peripherals). For example, the smart terminal can be connected to one or more peripherals via a Bluetooth connection, a WiFi direct connection, an infrared connection, a ZigBee connection, a Bluetooth Low Energy (BLE) connection, a WiMax connection, a Low Power Radio (LPR) connection, a Near Field Communications (NFC) connection, etc.

Various embodiments provide improved precision of context awareness. According to various embodiments a function is added to a smart terminal to manage context tags of peripherals (e.g., smart peripherals). The addition of the function to the smart terminal can improve the precision of context awareness. As an example, the smart terminal may set up an appropriate context tag for each smart peripheral. When the smart terminal is connected to one or more smart peripherals, the smart terminal determines the corresponding attributes of the one or more smart peripherals based on context tags. The smart terminal can use the determined corresponding attributes in connection with determining the particular current context of the user associated with the smart terminal or a current context of the smart terminal.

As used herein, a context tag corresponds to an identifier (e.g., name) or value corresponding to a context. For example, a context tag can be associated with a smart peripheral and a smart terminal can use one or more context tags corresponding to one or more smart peripherals in connection with determining a current context of the smart terminal (or user thereof). In some embodiments, the context tag is used to identify a context.

Figure 1:
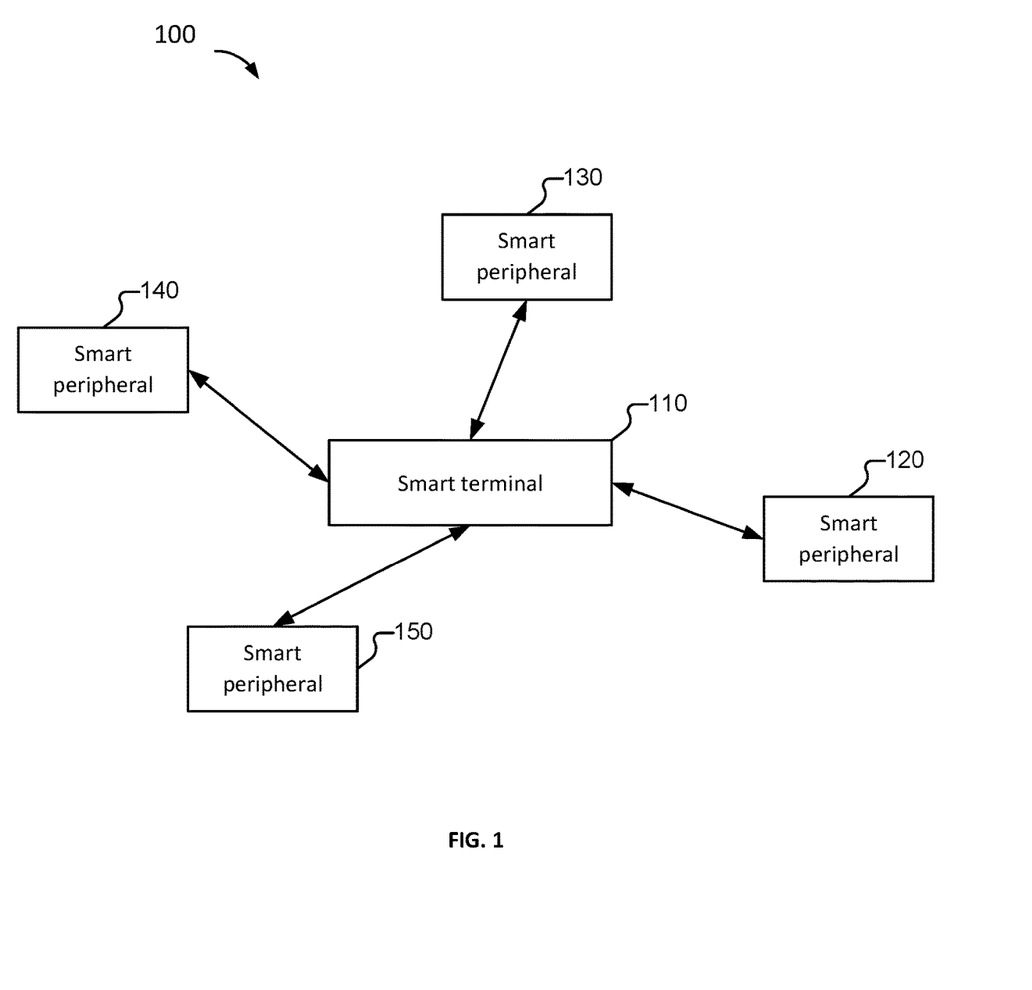
FIG. 1 is a diagram of a system for a smart terminal to perform context awareness according to various embodiments of the present application.

FIG. 1 is a diagram of a system for a smart terminal to perform context awareness according to various embodiments of the present application.

Referring to FIG. 1, system 100 is provided. System 100 can implement at least part of process 200 of FIG. 2 and/or process 500 of FIG. 5. System 100 can implement associations 300 of FIG. 3, service information 400 of FIG. 4, and/or computer system 600 of FIG. 6.

System 100 comprises smart terminal 110 and one or more peripherals 120, 130, 140, and 150. In some embodiments, peripherals 120, 130, 140, and 150 correspond to smart peripherals. Smart terminal 110 is connected to the one or more peripherals 120-150 via one or more connections such as a wireless connection. In some embodiments, smart terminal 110 is connected to a first smart peripheral via a first connection and to a second smart peripheral via a second connection, and the first connection and the second connection can be different.

Smart terminal 110 can connect to various kinds of smart peripherals in multiple ways, such as Bluetooth, WiFi, NFC, etc. Smart terminal 110 can use information provided by the one or more smart peripherals 120-150 in connection with determining a current context of the user (or of smart terminal 110). As an example, smart terminal 110 can infer the time, location, and current activity of the user based on whether a smart peripheral (e.g., a particular smart peripheral of the one or more smart peripherals 120-150). A smart peripheral can include, a smart watch, a smart bracelet, a smart TV, a near field communication (NFC) label, etc. Smart terminal 110 precisely determines the current context (e.g., of the user or smart terminal 110) based at least in part on the inferred time, location, and/or current activity of the user. Smart terminal 110 can infer other information from which the current context can be determined.

According to various embodiments, smart terminal 110 can obtain a set of context tags from a cloud platform. The set of context tags can be configured according to one or more standards set by the network side (e.g., a public standard). Smart terminal 110 can obtain the set of context tags in advance of using the context tags in connection with determining a current context. For example, smart terminal 110 stores the set of context tags on a local storage of smart terminal 110. In some embodiments, smart terminal 110 obtains a personalized set of context tags. The personalized set of context tags can be configured by the user or according to user preferences or settings (e.g., according to personal standards of the user). Smart terminal 110 can obtain the personalized set of context tags in accordance with user instructions. In some embodiments, a user defines a personalized set of context tags based at least in part on one or more tags stored locally at smart terminal 110 and/or stored remotely.

According to various embodiments, smart terminal 110 determines a current context (e.g., of the user or of smart terminal 110) based at least in part on one or more context tags.

For example, a set of context tags obtained by smart terminal 110 is as shown in Table 1.

TABLE 1

| Identifier (ID) | Context Tag |
| --- | --- |
| 1 | Home |
| 2 | Company |
| 3 | Private car |
| 4 | Public transportation |
| 5 | Usual mall |
| 6 | Usual restaurant |
| 7 | Hotel |
| 8 | Exercise |
| 9 | Television entertainment |
| 10 | Watch |
| ... | ... |

A mapping of context tags to smart peripherals can be stored. For example, smart terminal 110 can store the mapping of context tags to smart peripherals locally. A smart peripheral can be identified based on one or more identifiers such as a media access control (MAC) address, a serial number, a unique device identifier (UDID), international mobile equipment identifier (IMEI), etc. The smart peripheral can communicate the one or more identifiers to smart terminal 110. In response to receiving the one or more identifiers from the smart peripheral, smart terminal 110 can query the mapping of context tags to smart peripherals to determine context tags associated with a current context (e.g., of the user or smart terminal). For example, the mapping of context tags to smart peripherals can store context tags to one or more identifiers associated with the smart peripherals, and smart terminal 110 can use the one or more identifiers to look up the corresponding context tags from the mapping of context tags to smart peripherals.

In some embodiments, after obtaining a set of context tags, smart terminal 110 can, with regard to each smart peripheral with which smart terminal 110 is connected, select a context tag associated with a connection ID for each smart peripheral. Smart terminal 110 can select one or more context tags corresponding to each smart peripheral to which smart terminal 110 is connected according to various approaches.

According to a first approach, relationships (or associations) between each type of smart peripheral and corresponding context tags are set up. The relationships between a type of smart peripheral and a corresponding context tag can be set up in accordance with user instructions or user settings.

According to the first approach, when smart terminal 110 first connects to a smart peripheral, smart terminal 110 can prompt a user of smart terminal 110 to set one or more context tags corresponding to the smart peripheral. Smart terminal 110 can prompt the user for the one or more context tags corresponding to the smart peripheral while recording the connection ID of the smart peripheral. In some embodiments, in response to connecting with the smart peripheral (e.g., upon an initial connection), smart terminal 110 can provide the user with a list of context tags with which to select one or more context tags corresponding to the smart peripheral. In some embodiments, in response to connecting with the smart peripheral (e.g., upon an initial connection), the user can input to smart terminal 110 one or more context tags corresponding to the smart peripheral. Smart terminal 110 can display on a user interface thereof the prompt for setting the one or more context tags to the user. The user can input to smart terminal 110 (e.g., via a user interface) the setting of the one or more context tags corresponding to the smart terminal with which smart terminal 110 is connected.

As an example, after a user connects a smart phone (e.g., smart terminal 110) to a smart television set used at home (e.g., smart peripheral 120), the user actively sets up the context tag "Home" for the smart television set.

According to a second approach, relationships (or associations) between each type of smart peripheral and corresponding context tags are set up based on user operating behavior. As an example, one or more context tags corresponding to a smart peripheral are set by smart terminal 110. As another example, one or more context tags corresponding to a smart peripheral are set by a server (with which smart terminal 110 communicates). The setting (or associating) of the one or more context tags corresponding to the smart peripheral based on user operating behavior can be set based at least in part on one or more of historical information (of the user, a group of one or more users, the smart terminal, etc.), user settings or preferences, etc. Smart terminal 110 or a server can infer a context tag to be associated with a smart peripheral based at least in part on an operating behavior. The user operating behavior can comprise one or more applications executed in connection with the smart peripheral (e.g., an application executed while the smart peripheral is connected), a time at which the smart peripheral is connected, a location at which the smart peripheral is connected, a type of information (e.g., content) consumed when the smart peripheral is connected, a length of time for which the smart peripheral is connected, a number of times the smart peripheral is connected within a predefined period of time (e.g., 10 minutes), etc.

According to the second approach, smart terminal 110 can make a reasonable inference based on the current time after smart terminal 110 has connected with a smart peripheral on multiple occasions, even if the user has not set the context tag. The smart peripheral is thus assigned an appropriate context tag. For example, a user connects smart terminal 110 to the company's WiFi router every day at work. After the number of connections reaches a set threshold (e.g., 10), the smart terminal infers that the user is in a work environment based on the fact that the connection time interval is work hours (e.g., 8:00-5:30) and sets the appropriate context tag "Company" corresponding to the company's WiFi router. As another example, the user connects ear phones to smart terminal 110 and then proceeds to exercise. Smart terminal 110 can infer that the user is exercising based on inputs from various modules in smart terminal 110 such as an accelerometer, a GPS module, etc., or based on a determined location measured by a GPS module or based on one or more wireless access points with which smart terminal 110 is connected. After a set threshold (e.g., 10) number of times the ear phones are connected with smart terminal 110 and the user proceeds to exercise, the smart terminal infers that the ear phones are used in connection with exercise. Accordingly, smart terminal 110 associates one or more context tags corresponding to exercise to the ear phones.

Figure 2:
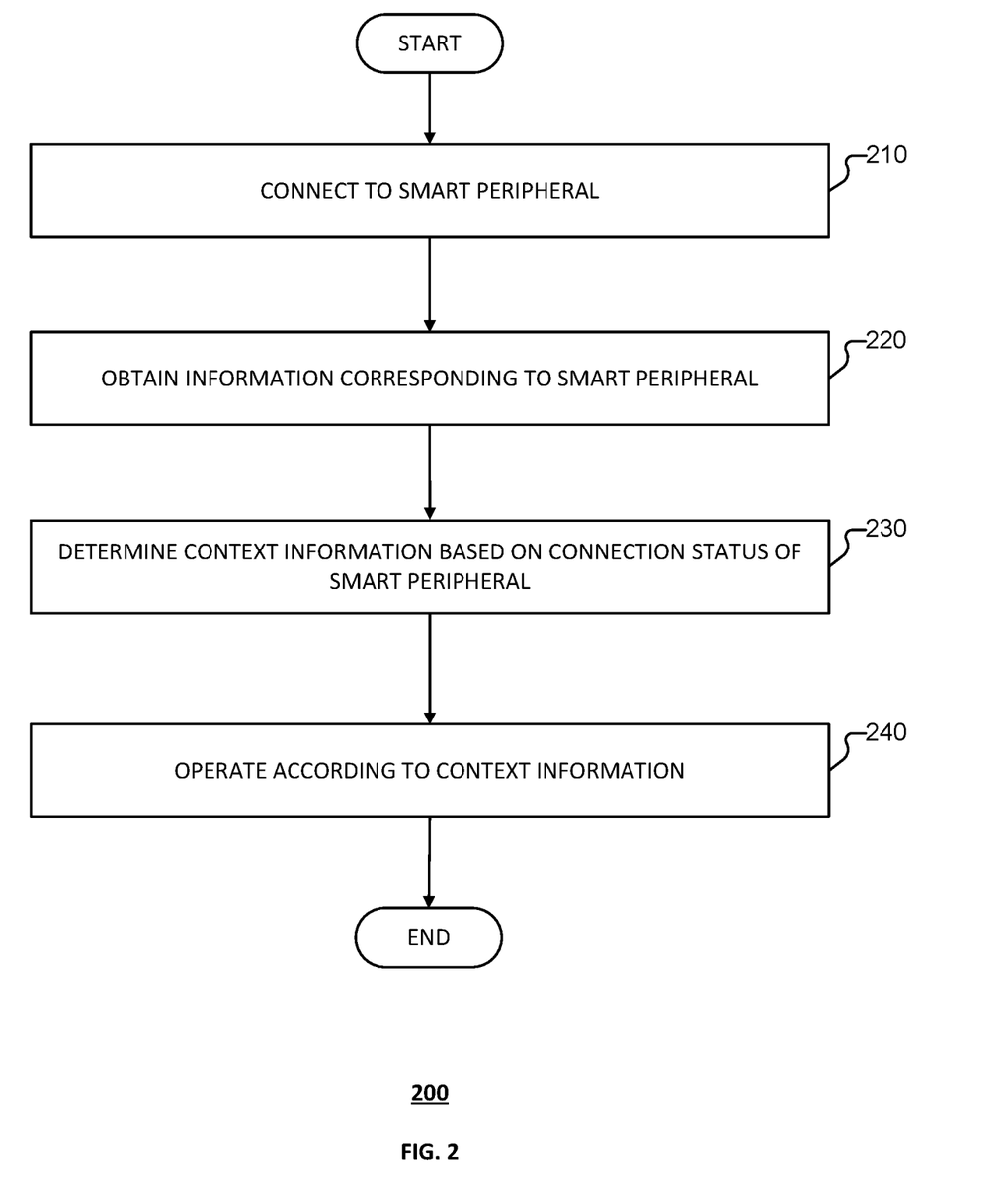
FIG. 2 is a flowchart of a method for a smart terminal to conduct context awareness according to various embodiments of the present application.

FIG. 2 is a flowchart of a method for a smart terminal to conduct context awareness according to various embodiments of the present application.

Referring to FIG. 2, process 200 is provided. Process 200 can be implemented in connection with process 500 of FIG. 5. Process 200 can be implemented by smart terminal 110 of system 100 of FIG. 1. Process 200 can be implemented at least in part by system 100 of FIG. 1, and/or computer system 600 of FIG. 6. Process 200 can be implemented in connection with associations 300 of FIG. 3, and/or service information 400 of FIG. 4.

At 210, a peripheral is connected. In some embodiments, the peripheral corresponds to a smart peripheral. The smart terminal can connect to the smart peripheral via one or more wireless connections. The smart terminal can automatically connect to the smart peripheral in response to detecting the smart peripheral (e.g., when the terminal comes within range of the smart peripheral) or manually based on a user input. In connection with the smart terminal connecting to the smart peripheral, the smart peripheral can provide one or more identifiers corresponding to the smart peripheral. As an example, the smart terminal can connect to a smart peripheral in the following (but not limited to) ways: connecting to a smart peripheral via a Bluetooth channel; connecting to a smart peripheral via a local area network channel (e.g., a WiFi router); or connecting to a smart peripheral via near-field connection (NFC) technology.

At 220, information corresponding to the peripheral (e.g., smart peripheral) is obtained. In some embodiments, the smart terminal obtains the information corresponding to the smart peripheral. The information corresponding to the smart peripheral can comprise one or more context tags. The one or more context tags are used in connection with describing the operating environment of the smart peripheral and/or smart terminal. The one or more context tags can be used for determining one or more configurations or settings for operating the smart terminal.

The smart terminal can obtain the one or more context tags according to various schemes. As an example, the smart terminal can obtain the one or more context tags from the smart peripheral (e.g., the smart peripheral can provide the context tag or an identifier associated therewith to the smart terminal). As another example, the smart terminal can obtain the one or more context tags from a user (e.g., via an input to a user interface of the smart terminal). As another example, the smart terminal can obtain the one or more context tags from a mapping of context tags to smart peripherals based on the smart peripheral or information provided to the smart terminal such as an identifier of the smart peripheral or a type of the smart peripheral. As another example, the smart terminal can obtain the one or more context tags based on an inferring of the context tags based on an operating behavior of the smart terminal in relation to the smart peripheral.

According to various embodiments, the smart terminal requests the smart peripheral to return a context tag corresponding to the smart peripheral. In some embodiments, the smart terminal sends a request for a context tag in connection with a connection process between the smart terminal and the smart peripheral.

For example, suppose that the smart terminal and a car system (e.g., a smart peripheral) are both provided with a unified NFC password. Thus, when the user is entering the car, and after the smart terminal has come within proximity (e.g., a range of communication) of the car system, the smart terminal and the car system detect each other according to a shared protocol and become aware of each other's presence. The smart terminal uses the NFC password to obtain the context tag from the car system. For example, the smart terminal can use the NFC password in connection with obtaining an access right to the car system. In response to the smart terminal obtaining an access right to the car system, the smart terminal can obtain the context tag from the car system. In some embodiments, the smart terminal communicates the NFC password to the car system. The car system can validate the NFC password and in response to determining the NFC password obtained from the smart terminal is validated, the car system can provide the smart terminal with the access right to the car system. For example, the smart terminal communicates a request for a context tag in connection with communicating an NFC password to establish a connection between the smart terminal and the car system.

As another example of the smart terminal obtaining the context tag from the smart peripheral, some merchants set up their own context tags for their own smart peripherals. For example, a WiFi router in a café is set up with the context tag "XYZ Café." A user (e.g., a customer of the café) uses a smart terminal to connect to the WiFi router (e.g., the smart peripheral) after arriving at the café or when the smart terminal is within range of the WiFi router of the café. In response to connecting to the WiFi router (or in connection with the connecting of the smart terminal to the WiFi router), the smart terminal requests the WiFi router to send the context tag to the smart terminal. The WiFi router sends the context tag in response to the request from the smart terminal. Although the "XYZ Café" context tag corresponding to the WiFi router was not assigned by the user, the smart terminal can identify the current user context if the context tag is recorded in the set of context tags as shown in Table 1 and the smart terminal has also saved this set of context tags. In such situations, the smart terminal is therefore able to sense the user's context based on an obtained context tag in contexts familiar to the user and likewise in unfamiliar contexts.

According to various embodiments, the smart terminal obtains a connection identifier (ID) for a smart peripheral and obtains a context tag set up locally to correspond to the connection ID of the smart peripheral. The smart terminal can obtain an identifier corresponding to the smart peripheral and query a mapping of identifiers to context tags to determine the context tag corresponding to the smart peripheral.

As an example, the smart terminal can request that a smart peripheral send to the smart terminal a connection ID corresponding to the smart peripheral. In some embodiments, the smart terminal communicates with the smart peripheral using an NFC protocol, and uses the NFC password to fetch the connection ID from the smart peripheral. Because the smart terminal has locally set up relationships (e.g., mappings) between smart peripheral connection IDs and context tags (as described further in connection with FIG. 3), the smart terminal can use the relationships between smart peripheral connection IDs and context tags as a basis to obtain context tags assigned in advance to correspond to smart peripheral connection IDs. The smart peripheral connection IDs can be the device IDs of smart terminals, an indication of a type of peripheral device, information set up by the manufacturer of the smart peripheral, or descriptive information set up by the user.

At 230, context information is determined based on a connection status of a peripheral (e.g., smart peripheral). The status of a connection between a smart terminal and a smart peripheral can be used in connection with determining context information. For example, in response to determining that the smart terminal is connected with the smart peripheral, the context information can be determined. In some embodiments, the smart terminal determines the context information based at least in part on one or more context tags corresponding to one or more smart peripherals with which the smart terminal is connected. In some embodiments, the context information comprises one or more context tags corresponding to one or more smart peripherals with which the smart terminal is connected.

At 240, the smart terminal operates according to the context information. The smart terminal can store a mapping of operations to context information. The smart terminal can query the mapping of operations to context information based on the determined context information, and can determine an operation to perform according to the operation corresponding to the determined context information.

In some embodiments, the smart terminal launches (e.g., executes) an application associated with a predefined context. In response to determining that the context information corresponds to the predefined context, the smart terminal launches the application. In some embodiments, the context information also specifies the configuration settings of the application that is launched.

In some embodiments, the smart terminal can configure one or more settings of the smart terminal in response to determining that the context information corresponds to a predefined context. The one or more settings that can be configured include a power setting, a preferred network setting, a screen brightness setting, a volume setting, etc. Other settings can be configured.

In some embodiments, the context information comprises context descriptive information corresponding to the context tag and the smart terminal locally broadcasts the context descriptive information. The smart terminal can generate the context descriptive information based on the context tag corresponding to the smart peripheral with which the smart terminal is connected. As an example, the operating system can locally broadcast the context descriptive information to one or more applications or processes running on the smart terminal. The broadcast can be sent by the operating system of the smart terminal. For example, the smart terminal can use an operating system mechanism (e.g., Android Broadcast on Android operating systems) to broadcast the context descriptive information.

In some embodiments, the connection status of the smart peripheral serves as a basis to generate context descriptive information corresponding to the obtained context tag, and the context descriptive information at least comprises: context tag and smart peripheral connection status.

As an example, after a smart terminal connects to a smart thermostat (e.g., a Nest® unit) that can control air-conditioning, heating, etc., the obtained context tag corresponding to the smart thermostat (e.g., smart air-conditioning control) is "Home." The smart terminal can continually or periodically monitor the connection status between the smart terminal and the smart peripheral (e.g., the smart thermostat), and according to monitoring, can determine that the connection between the smart terminal and the smart peripheral remains unbroken. The smart terminal can determine that the user has been continuously at home based on the connection between the smart terminal and the smart peripheral remaining connected. For example, the smart terminal can use the connection status of the connection between the smart terminal and the smart peripheral to infer a context of the smart terminal (e.g., the location of the smart terminal being at home). The smart terminal deems the presence of the connection between the smart terminal and the smart thermostat as being indicative of the location of the smart terminal being at home (or the location corresponding to the smart thermostat). Table 2 provides an example of the generated context descriptive information according to this example.

TABLE 2

| Time: | Nov. 20, 2015 8:00 PM |
|---|---|
| Connection status | Connected |
| Context tag: | Home |
| Connection ID: | XYZ air-conditioning |

In some embodiments, the smart terminal infers current user behavior based on the connection status of the smart peripheral. The smart terminal uses current user behavior as a basis to generate context descriptive information corresponding to the obtained context tag (e.g., corresponding to the smart peripheral), and the context descriptive information at least comprises: context tag and current user behavior.

As an example, a smart terminal can connect with a smart peripheral that is a Bluetooth car system. The smart terminal can connect with the Bluetooth car system in response to moving within proximity (e.g., range) of the Bluetooth car system. The smart terminal can connect with the Bluetooth car system automatically or in response to a user input. After a smart terminal connects to the Bluetooth car system, the smart terminal obtains the context tag corresponding to the Bluetooth car system. The context tag corresponding to the Bluetooth car system is "Private Car." When the user leaves the car (or is taken out of proximity of the Bluetooth car system), the smart terminal detects disconnection from the smart peripheral and consequently infers that the user has left the car (e.g., that the location of the smart terminal is no longer in the car). Table 3 provides an example of generated context descriptive information.

TABLE 3

| Time: | Nov. 22, 2015 2:00 PM |
|---|---|
| User behavior: | Left |
| Context tag: | Private car |
| Connection ID: | XYZ Sports Car |

After obtaining the generated context descriptive information, the smart terminal broadcasts the context descriptive information locally to all applications. The context descriptive information can be broadcast by the operating system of the smart terminal. An application that receives the context descriptive information can perform one or more functions or services according to a matching of service content for the application and the context descriptive information. For example, in response to receiving the context descriptive information, an application can query a mapping of functions or services to context descriptive information, and can determine a function or service to perform for the context corresponding to the context descriptive information.

In the case of the smart terminal disconnecting from the Bluetooth car system according to the example above, the corresponding context descriptive information can be indicative of the disconnection, and a media application running on the smart terminal can stop playback upon receiving the context descriptive information corresponding to the disconnection, or the media application can switch outputs to another smart peripheral, etc.

In the case of the smart terminal disconnecting from the Bluetooth car system according to the example above, the corresponding context descriptive information can be indicative of the disconnection, and in response to receiving the context descriptive information for the disconnection, a location-based service application can identify areas of interest near the location of the smart terminal such as restaurants, shops, ATMs, etc.

According to various embodiments, if, after broadcasting current context descriptive information, the smart terminal receives service information provided as feedback by at least one application regarding the context descriptive information, the smart terminal presents the service information to the user. For example, the smart terminal can detect that the context information corresponds to a context in which the user is jogging. In response to detecting that the context information corresponds to a context in which the user is jogging, the smart terminal can launch a music service for the user.

For example, with regard to the context described above of the user leaving a private car, after the smart terminal broadcasts the context descriptive information to the applications of the smart terminal, the smart terminal obtains feedback from the application entitled "Parking Service" and obtains the physical location of the current parking place. Accordingly, a user can efficiently locate the private car by accessing the parking information. Further description of this example is provided in connection with FIG. 4.

Figure 3:
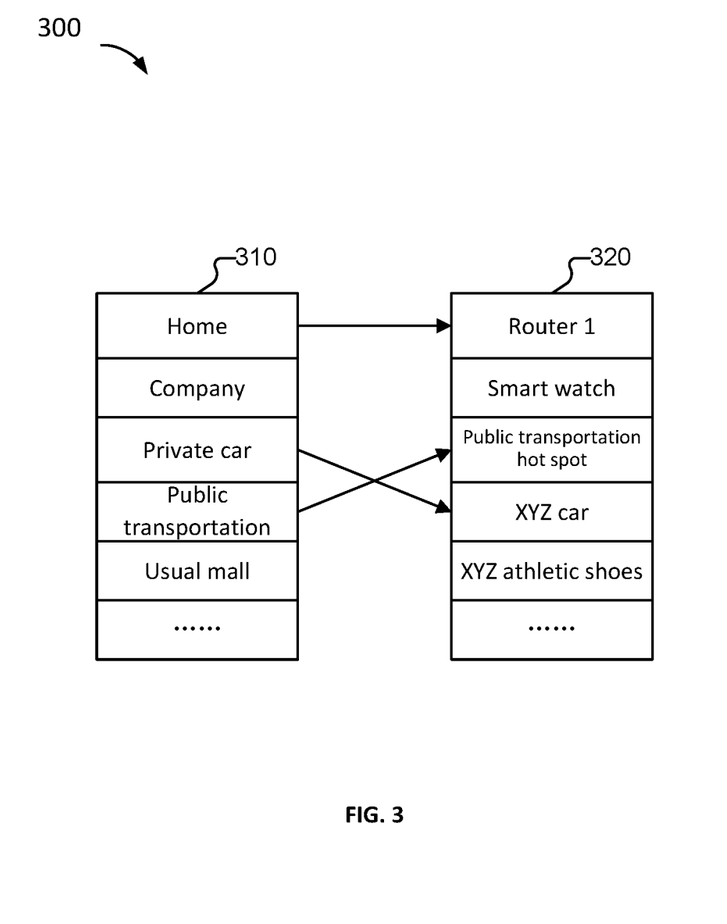
FIG. 3 is a relational diagram of associations between smart peripheral connection identifiers (IDs) and context tags according to various embodiments of the present application.

FIG. 3 is a relational diagram of associations between smart peripheral connection identifiers (IDs) and context tags according to various embodiments of the present application.

Referring to FIG. 3, associations 300 are provided. Associations 300 can be implemented in connection with process 200 of FIG. 2, and/or 500 of FIG. 5. Associations 300 can be implemented by smart terminal 110 of system 100 of FIG. 1 and/or computer system 600 of FIG. 6. Associations 300 can be implemented in connection with service information 400 of FIG. 4.

Associations 300 between one or more context tags 310 and one or more peripherals 320 (e.g., smart peripherals) can be stored. The smart terminal can locally store mappings between the one or more context tags 310 and the one or more peripherals 320. The associations 300 between one or more context tags 310 and one or more smart peripherals 320 can be configured in response to a new smart peripheral being connected to the smart terminal, or in response to a user configuring a new smart peripheral on the smart terminal.

The one or more context tags 310 comprise one or more of home, company, private car, public transportation, usual mall (e.g., commonly visited mall), exercise, work, etc.

The one or more smart peripherals 320 can comprise one or more of a router, a smart watch, a public transportation hotspot, a user's car (e.g., a Bluetooth car system for the user's car), a user's smart athletic shoes, a user's smart watch, etc.

As illustrated in FIG. 3, the context tag corresponding to private car is associated with the XYZ car (e.g., denoting the user's car), and the context tag corresponding to public transportation is associated with a public transportation hot spot.

Figure 4:
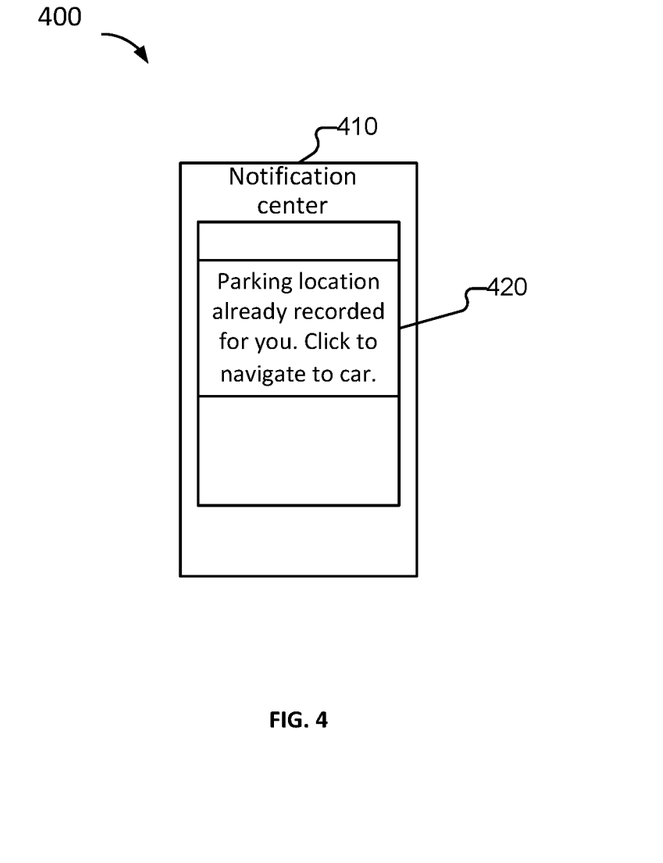
FIG. 4 is a diagram of service information provided as feedback by an application according to various embodiments of the present application.

FIG. 4 is a diagram of service information provided as feedback by an application according to various embodiments of the present application.

Referring to FIG. 4, service information 400 is provided. Service information 400 can be implemented in connection with process 200 of FIG. 2, and/or 500 of FIG. 5. Service information 400 can be implemented by smart terminal 110 of system 100 of FIG. 1 and/or computer system 600 of FIG. 6. Service information 400 can be implemented in connection with associations 300 of FIG. 3.

Service information 400 is presented on screen 410 of a smart terminal. For example, service information 400 is presented at a notification center of the smart terminal (e.g., the notification center on the graphical user interface of the smart terminal). The notification center of the smart terminal can be accessed via input of a predefined input such as a swipe down from the top of the screen of the smart terminal. Service information 400 can be presented as a notification 420 in the notification center. In some embodiments, service information 400 is presented as a selectable link. In response to selection of, or input to, the selectable link, one or more functions or applications can be launched. For example, as illustrated in FIG. 4, selection of notification 420 can launch a mapping application that can provide the user with navigation to the user's car.

In some embodiments, the providing of the service information is triggered based on a connection status between a terminal and the peripheral (e.g., a smart peripheral). For example, when a user enters a car (or comes within a predefined proximity or range of wireless signals), the user's terminal (e.g., phone) connects to the car system (e.g., the car operating system), and a navigation application can be launched based on the context information (e.g., the terminal being connected to the car system) to provide a navigation service to the user.

Figure 5:
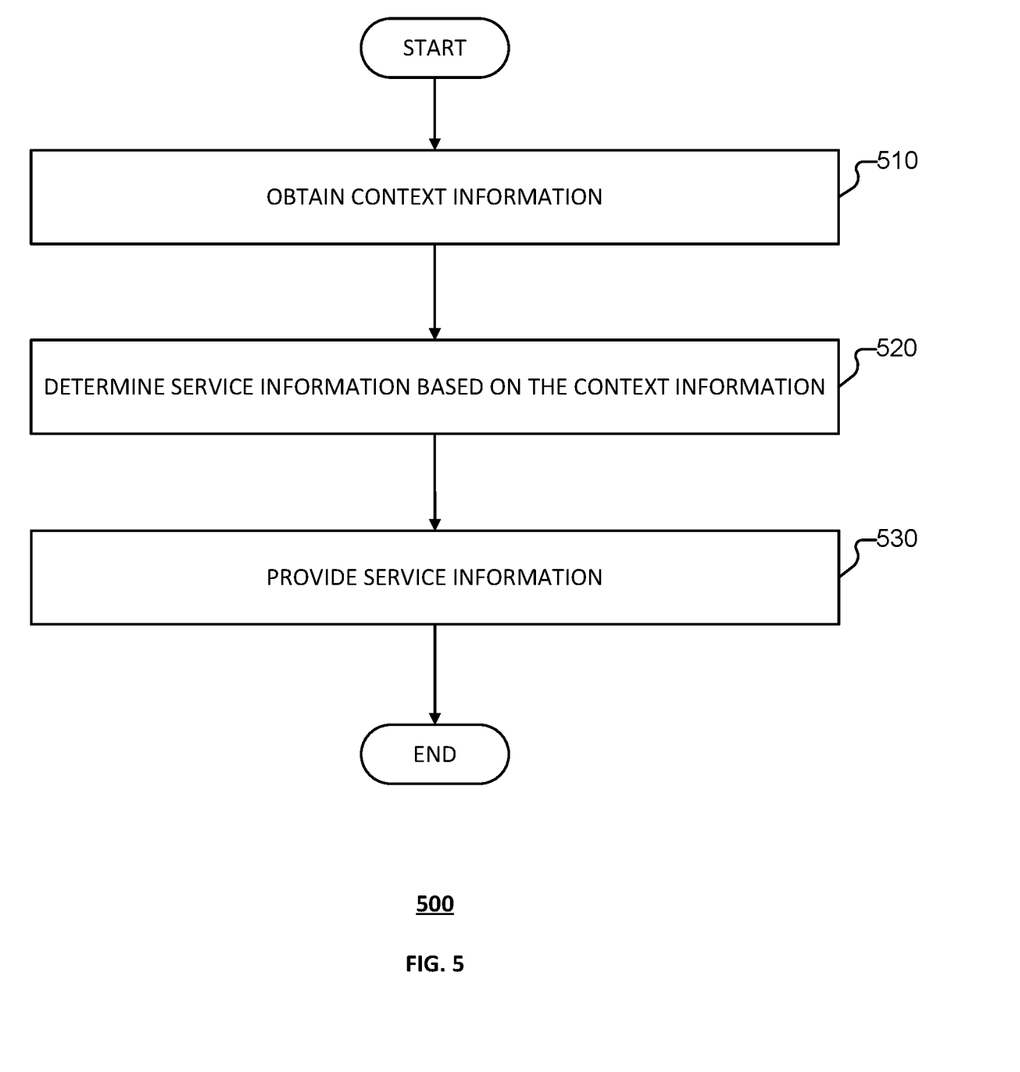
FIG. 5 is a flowchart of a method for providing a service according to various embodiments of the present application.

FIG. 5 is a flowchart of a method for providing a service according to various embodiments of the present application.

Referring to FIG. 5, process 500 is provided. Process 500 can be implemented in connection with process 200 of FIG. 2. Process 500 can be implemented by smart terminal 110 of system 100 of FIG. 1. Process 500 can be implemented at least in part by system 100 of FIG. 1, and/or computer system 600 of FIG. 6. Process 500 can be implemented in connection with associations 300 of FIG. 3, and/or service information 400 of FIG. 4.

According to various embodiments, process 500 is performed by an application on the smart terminal. For example, process 500 is performed by an application running on the smart terminal. As an example, process 500 can be invoked in response to context information being communicated to the application.

At 510, context information is obtained. The context information can comprise context descriptive information that is generated by the smart terminal. As an example, the context descriptive information at least comprises: context tag and smart peripheral connection status. An application can receive the context descriptive information that was broadcast (e.g., by the operating system of the smart terminal or another process running on the smart terminal). After the smart terminal, on which the application is located, is connected to a smart peripheral, the context descriptive information is generated on the basis of the context tag set up to correspond to the smart peripheral and the connection status of the smart peripheral.

At 520, service information is determined based on the context information. As an example, an application can query a mapping of functions or services to context descriptive information, and can determine a function or service to perform for the context corresponding to the context descriptive information. In response to receiving the context information, the application can determine the service information by querying mapping of functions or services to context descriptive information to determine one or more functions or services to perform for the obtained context information. The application can generate the service information in connection with performing the one or more functions or services to perform for the obtained context information.

At 530, service information is provided. In some embodiments, the application provides the service information to the operating system or to another application or process running on the smart terminal. In some embodiments, the application provides the service information to the user via a graphical user interface. For example, the application provides the service information within the application such that the user can access the service information in the application.

In some embodiments, the service information is provided directly to the user based on the aforesaid context descriptive information.

In some embodiments, the service information is sent to a notification center on the aforesaid smart terminal based on the context descriptive information. The notification center can provide the service information to the user at a set time or in response to the user inputting a predefined input (e.g., to access the notification center).

An even more detailed explanation of various embodiments is given below using several specific application scenarios.

First scenario: Assume that the smart terminal is a notebook computer and that the smart peripheral is a WiFi router at home.

After the user returns home, the user turns on the notebook computer, and the notebook computer connects to the WiFi router. In response to connecting to the WiFi router, the notebook computer obtains the context tag "Home." If the notebook computer detects that the connection with the WiFi router is being maintained (e.g., a connection time greater than 5 seconds or another threshold time period), the notebook computer infers that the user's behavior is "At Home." The notebook computer broadcasts the "Home" context descriptive information to all local applications of the notebook computer. An application associated with "Upcoming Television Programs" then responds to the received context descriptive information and reports back with a list of the day's television programs and recommends various programs to the user, (e.g., recommends entertaining videos and movies).

Second Scenario: Assume that the smart terminal is a smart watch and that the smart peripheral is smart athletic shoes.

A user is performing outdoor athletic activities. After the smart watch that the user is wearing connects to the user's smart athletic shoes, the smart watch obtains the context tag "Exercising." If the smart watch detects that the connection with the smart athletic shoes is being maintained (e.g., a connection time greater than 2 seconds or another threshold time period), the smart watch infers that the user is "exercising." The smart watch broadcasts the "Exercising" context descriptive information to all local applications on the smart watch. An application called "Media Player" then responds to the received context descriptive information and provides as feedback songs with a strong beat that are suitable for jogging. The smart watch presents the list of songs to the user and makes the corresponding songs available for user listening.

Third scenario: Assume that the smart terminal is a smart phone and that the smart peripheral is a WiFi router at a mall.

A user is strolling through a mall. In response to the user's smart phone connecting to a merchant's WiFi router, the smart phone obtains the context tag "Shopping." If the smart phone detects that the connection with the WiFi router is being maintained (e.g., a connection time greater than 10 seconds or another threshold time period), the smart phone infers that the user is "shopping." The smart phone broadcasts the "Shopping" context descriptive information to all local applications on the smart phone. An application called "Great Deals" then responds to the received context descriptive information by providing the user with discount information, recommended food information, etc.

In the three scenarios described above, the smart terminal is always (e.g., regularly or periodically) monitoring the connection status between the smart terminal and one or more smart peripherals. Because connection statuses vary, different context descriptive information may be generated, which in turn triggers different applications to provide feedback.

Figure 6:
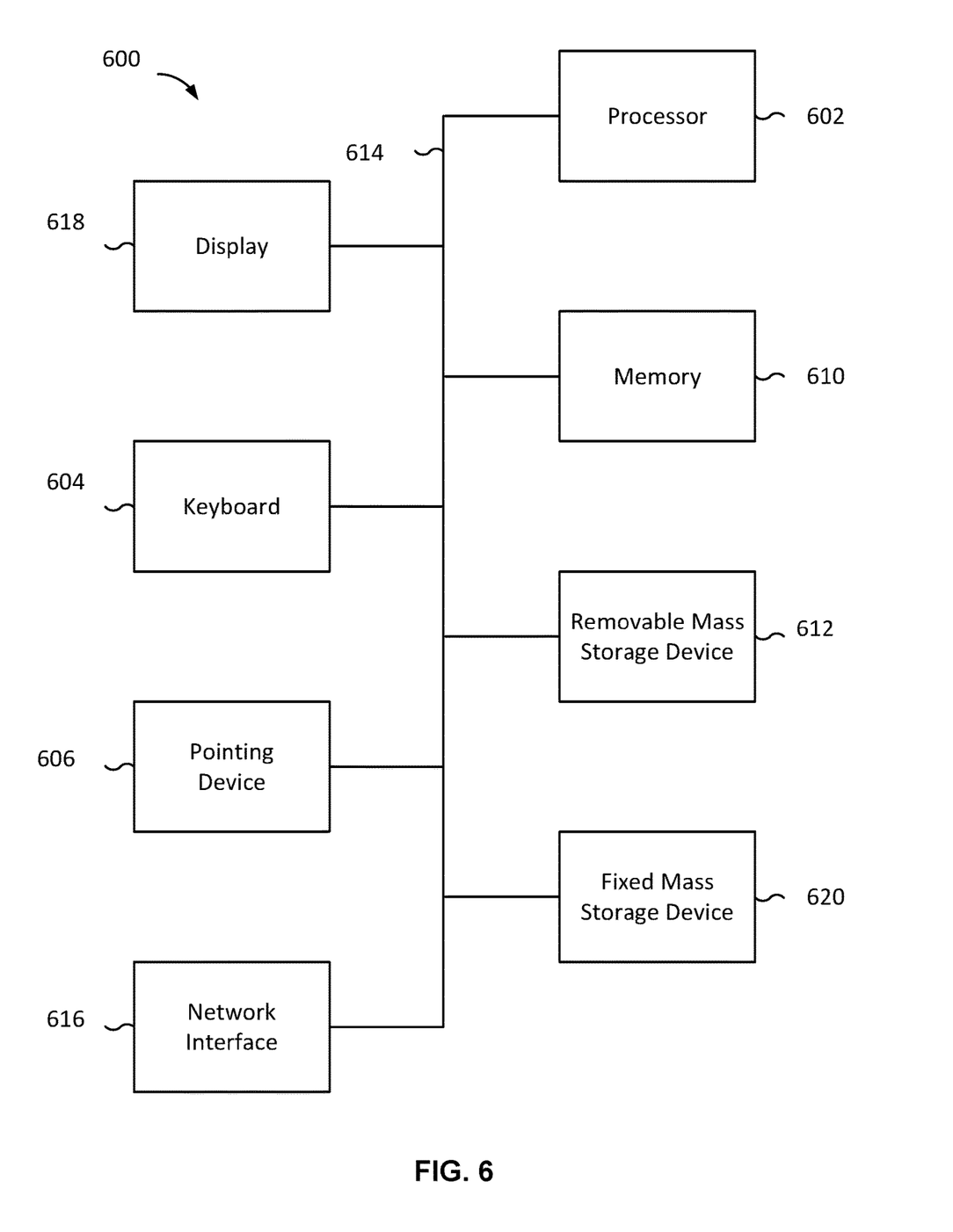
FIG. 6 is a functional diagram of a computer system for performing context awareness and providing services according to various embodiments of the present disclosure.

FIG. 6 is a functional diagram of a computer system for performing context awareness and providing services according to various embodiments of the present disclosure.

Referring to FIG. 6, computer system 600 is provided. Computer system 600 can implement at least part of process 200 of FIG. 2 and/or process 500 of FIG. 5. Computer system 600 can implement associations 300 of FIG. 3, service information 400 of FIG. 4, and/or system 100 of FIG. 1.

Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618).

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown). The memory can be a non-transitory computer-readable storage medium.

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storage device 612 and fixed mass storage 620 generally store additional programming instructions, data, and the like that typically are not in active use by the processor 602. It will be appreciated that the information retained within mass storage device 612 and fixed mass storage 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

It should be understood that the devices and methods that are disclosed in the several embodiments provided above can be realized in other ways. For example, the device embodiment described above is merely illustrative. For example, the delineation of units is merely a delineation according to local function. The delineation can take a different form during actual implementation.

According to various embodiments, in response to a smart terminal connecting to a smart peripheral, the smart terminal obtains a context tag corresponding to the smart peripheral and uses the smart peripheral connection status and the obtained context tag as a basis to generate related context descriptive information. Moreover, the smart terminal (e.g., the operating system of the smart terminal) broadcasts the context descriptive information to one or more local applications. Thus, without adding to the operating load of the smart terminal, the user's current context is precisely identified and the smart terminal's context awareness abilities are improved. In addition, accurate context descriptive information can be provided to all applications, enabling each application to provide prompt, matched service. User experience is effectively improved as a result.

A person skilled in the art should understand that embodiments of the present application can be provided as methods, systems, or computer program products. Therefore, the present application can take the form of an entirely hardware embodiment, an entirely software embodiment, or an embodiment that combines software and hardware aspects. In addition, the present application can take the form of computer program products implemented on one or more computer-operable storage media (including but not limited to magnetic disk storage devices, CD-ROMs, and optical storage devices) containing computer operable program codes.

The present application is described with reference to flowcharts and/or block diagrams based on methods, devices (systems), and computer program products of embodiments of the present application. Please note that each process and/or block within the flowcharts and/or block diagrams and combinations of processes and/or blocks within the flowcharts and/or block diagrams can be realized by computer commands. These computer program commands can be provided to general-purpose computers, special-purpose computers, embedded processors, or processors of other data-processing devices to give rise to a machine such that the commands by the computers or by the processors of other programmable data-processing devices give rise to devices used to implement the functions specified in one or more processes in a flowchart and/or in one or more blocks in a block diagram.

These computer program commands can also be stored in computer-readable memory that can guide computers or other programmable data-processing devices to operate according to specific modes, with the result that the commands stored in this computer-readable memory give rise to products that include command means. These command means implement the functions specified in one or more processes in a flow chart and/or one or more blocks in a block diagram.

These computer program commands can also be loaded onto a computer or other programmable data-processing device, with the result that a series of operating steps are executed on a computer or other programmable device so as to give rise to computer processing. In this way, the commands executed on a computer or other programmable device provide steps for implementing the functions specified by one or more processes in a flow chart and/or one or more blocks in a block diagram.

Although preferred embodiments of the present application have already been described, persons skilled in the art can make other alterations and modifications to these embodiments once they grasp the basic creative concept. Therefore, the attached claims are to be interpreted as including the preferred embodiments as well as all alterations and modifications falling within the scope of the present application.

Obviously, a person skilled in the art can modify and vary the present application without departing from the spirit and scope of the present application. Thus, if these modifications to and variations of embodiments of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:

connecting, by a terminal, to a peripheral, wherein the peripheral has been preconfigured with the terminal, and the terminal connects to the peripheral based on a passive detection that the peripheral is within a communication distance of the terminal;

in response to a determination that the peripheral is connected to the terminal, obtaining, by the terminal, information corresponding to the peripheral, wherein the information corresponding to the peripheral comprises an identifier associated with the peripheral;

obtaining, by the terminal, one or more context tags associated with the identifier associated with the peripheral, wherein:

the one or more context tags are obtained using the identifier associated with the peripheral;

at least one of the one or more context tags of the terminal is mapped to a context information that comprises one or more corresponding configurations, settings, or operations of the terminal;

the context information corresponds to one or more context tags of the terminal; and the context information is set in association with the one or more context tags based at least in part on an inferred operating behavior using historical information pertaining to use of the terminal by a user of the terminal when the terminal is connected to the peripheral;

determining, by the terminal, context information for a current context of the terminal, including:

using the one or more context tags and a mapping of the one or more context tags to the one or more contexts of the terminal to determine the context information for the current context of the terminal; and performing, by the terminal, one or more operations based at least in part on the context information, wherein:

the one or more operations including displaying a notification to a user on the terminal of an application associated with the current context information of the terminal; and the notification comprises a selectable link that, in response to selection by the user, causes the terminal to execute the application related to the current context information of the terminal.

2. The method of claim 1, wherein:

the one or more context tags are obtained using the identifier associated with the peripheral to perform a lookup with respect to a mapping of one or more predefined context tags to one or more predefined peripherals; and the obtaining the information corresponding to the peripheral information comprises:

determining that the connection status indicates that the terminal is connected to the peripheral; and in response to determining that the connection status indicates that the terminal is connected to the peripheral, querying the mapping of one or more predefined context tags to one or more predefined peripherals, and obtaining the one or more context tags corresponding to the peripheral to which the terminal is connected.

3. The method of claim 1, wherein the one or more context tags describe an operating environment of the peripheral.

4. The method of claim 1, wherein the context information comprises context descriptive information corresponding to at least one of the one or more context tags corresponding to the peripheral device.

5. The method of claim 4, further comprising:

broadcasting the context descriptive information to one or more applications on the terminal.

6. The method of claim 1, wherein the connecting to the peripheral comprises:

the terminal connecting to the peripheral via a Bluetooth channel; or the terminal connecting to the peripheral via a local area network channel; or the terminal connecting to the peripheral via near-field communication (NFC) technology; or the terminal connecting to the peripheral via a WiFi direct technology; or the terminal connecting to the peripheral via an infrared connection.

7. The method of claim 1, further comprising:

storing the pre-stored mapping of peripherals to information pertaining to one or more contexts, comprising:

communicating a request to the peripheral to return a context tag set up to correspond to the peripheral; or obtaining a connection identifier (ID) for the peripheral and obtaining a context tag set up locally to correspond to the connection ID for the peripheral.

8. The method of claim 1, further comprising:

obtaining, by the terminal, a set of context tags; and storing the pre-stored mapping of peripherals to information pertaining to one or more contexts, comprising:

storing a mapping of context tags to peripherals based at least in part on one or more of a user operating behavior or a user input, wherein the information corresponding to the peripheral comprises one or more context tags of the set of context tags.

9. The method of claim 8, wherein the set of context tags is obtained from a server or configured according to user input.

10. The method of claim 1, wherein the determining of the context information comprises:

using the connection status of the connection between the terminal and the peripheral as a basis to generate context descriptive information corresponding to the one or more context tags, the context descriptive information at least comprising: at least one of the one or more context tags and peripheral connection status.

11. The method of claim 1, wherein the determining the context information comprises:

inferring current user behavior based at least in part on the connection status of the connection between the terminal and the peripheral, and using the current user behavior as a basis to generate context descriptive information corresponding to the one or more context tags, the context descriptive information at least comprising: at least one of the one or more context tags and the current user behavior.

12. The method of claim 1, further comprising:

broadcasting context descriptive information to one or more applications on the terminal, wherein the context descriptive information is generated based at least in part on the context information, wherein the performing the one or more operations based at least in part on the context information comprises obtaining service information provided as feedback by at least one application based at least in part on the context descriptive information, and providing the service information to a user.

13. A method, further comprising:
receiving, by an application on a terminal, broadcast context descriptive information, wherein:
the broadcast context descriptive information is generated in response to a determination that the terminal connects to a peripheral, the peripheral having been preconfigured with the terminal, and the terminal connecting to the peripheral based on a passive detection that the peripheral is within a communication distance of the terminal;
the broadcast context descriptive information is generated based at least in part on one or more context tags;
the one or more context tags are set up to correspond to the peripheral and to a connection status of a connection between the terminal and the peripheral;
the one or more context tags are determined based at least in part on a pre-stored mapping of peripherals to information pertaining to one or more contexts; and
the pre-stored mapping of peripherals to information pertaining to one or more contexts tags is set based at least in part on an inferred operating behavior using historical information pertaining to use of the terminal by a user of the terminal when the terminal is connected to the peripheral; and
providing, by the application, service information based at least in part on the broadcast context descriptive information, wherein:
the context descriptive information comprises one or more corresponding configurations, settings, or operations of the terminal;
the service information comprises a notification to a user on the terminal of an application associated with the context descriptive information of the terminal; and
the notification comprises a selectable link that, in response to selection by the user, causes the terminal to execute the application related to the context descriptive information of the terminal.

14. The method of claim 13, wherein the providing the service information comprises:
providing the service information directly to a user based on the broadcast context descriptive information; or
communicating the service information to a notification center on the terminal, wherein the notification center presenting the service information to a user at a set time or in response to a preset input.

15. The method of claim 13, wherein the connection status of the connection between the terminal and the peripheral comprises an indication of an established connection between the terminal and the peripheral.

16. A terminal, comprising:
one or more processors configured to:
connect to a peripheral, wherein the peripheral has been preconfigured with the terminal, and the terminal connects to the peripheral based on a passive detection that the peripheral is within a communication distance of the terminal;
in response to a determination that the peripheral is connected to the terminal,
obtain information corresponding to the peripheral, wherein the information corresponding to the peripheral comprises an identifier associated with the peripheral;
obtaining, by the terminal, one or more context tags associated with the identifier associated with the peripheral, wherein:
the one or more context tags are obtained using the identifier associated with the peripheral;
at least one of the one or more context tags of the terminal is mapped to a context information that comprises one or more corresponding configurations, settings, or operations of the terminal;
the context information corresponds to one or more context tags of the terminal; and
the context information is set in association with the one or more context tags based at least in part on an inferred operating behavior using historical information pertaining to use of the terminal by a user of the terminal when the terminal is connected to the peripheral;
determine context information for a current context of the terminal, including:
using the one or more context tags and a mapping of the one or more context tags to the one or more contexts of the terminal to determine the current context information for the context of the terminal; and
perform one or more operations based at least in part on the context information, wherein:
the one or more operations including displaying a notification to a user on the terminal of an application associated with the current context information of the terminal; and
the notification comprises a selectable link that, in response to selection by the user, causes the terminal to execute the application related to the current context information of the terminal; and
one or more memories coupled to the one or more processors, configured to provide the one or more processors with instructions.

17. A terminal, comprising:
one or more processors configured to:
receive, by an application on the terminal, broadcast context descriptive information, wherein:
the broadcast context descriptive information is generated in response to a determination that the terminal connects to a peripheral, the peripheral having been preconfigured with the terminal, and the terminal connecting to the peripheral based on a passive detection that the peripheral is within a communication distance of the terminal;
the broadcast context descriptive information is generated based at least in part on one or more context tags;
the one or more context tags are set up to correspond to the peripheral and to a connection status of a connection between the terminal and the peripheral;
the one or more context tags are determined based at least in part on a pre-stored mapping of peripherals to information pertaining to one or more contexts; and
the pre-stored mapping of peripherals to information pertaining to one or more contexts tags is set based at least in part on an inferred operating behavior using historical information pertaining to use of the terminal by a user of the terminal when the terminal is connected to the peripheral; and
provide, by the application, service information based at least in part on broadcast the context descriptive information, wherein:
the context descriptive information comprises one or more corresponding configurations, settings, or operations of the terminal;
the service information comprises a notification to a user on the terminal of an application associated with the context descriptive information of the terminal; and
the notification comprises a selectable link that, in response to selection by the user, causes the terminal to execute the application related to the context descriptive information of the terminal; and
one or more memories coupled to the one or more processors, configured to provide the one or more processors with instructions.

18. A computer program product, the computer program product being embodied in a non-transitory computer readable storage medium and comprising computer instructions for:
connecting, by a terminal, to a peripheral, wherein the peripheral has been preconfigured with the terminal, and the terminal connects to the peripheral based on a passive detection that the peripheral is within a communication distance of the terminal;
in response to a determination that the peripheral is connected to the terminal,
obtaining, by the terminal, information corresponding to the peripheral, wherein the information corresponding to the peripheral comprises an identifier associated with the peripheral;
obtaining, by the terminal, one or more context tags associated with the identifier associated with the peripheral, wherein:
the one or more context tags are obtained using the identifier associated with the peripheral;
at least one of the one or more context tags of the terminal is mapped to a context information that comprises one or more corresponding configurations, settings, or operations of the terminal;
the context information corresponds to one or more context tags of the terminal; and
the context information is set in association with the one or more context tags based at least in part on an inferred operating behavior using historical information pertaining to use of the terminal by a user of the terminal when the terminal is connected to the peripheral;
determining, by the terminal, context information for a current context of the terminal, including:
using the one or more context tags and a mapping of the one or more context tags to the one or more contexts of the terminal to determine the context information for the context of the terminal; and
performing, by the terminal, one or more operations based at least in part on the context information, wherein:
one or more operations including displaying a notification to a user on the terminal of an application associated with the current context information of the terminal; and
the notification comprises a selectable link that, in response to selection by the user, causes the terminal to execute the application related to the current context information of the terminal.

19. A computer program product, the computer program product being embodied in a non-transitory computer readable storage medium and comprising computer instructions for:
receiving, by an application on a terminal, broadcast context descriptive information, wherein:
the broadcast context descriptive information is generated in response to a determination that the terminal connects to a peripheral, the peripheral having been preconfigured with the terminal, and the terminal connecting to the peripheral based on a passive detection that the peripheral is within a communication distance of the terminal;
the broadcast context descriptive information is generated based at least in part on one or more context tags;
the one or more context tags are set up to correspond to the peripheral and a connection status of a connection between the terminal and the peripheral and on a pre-stored mapping of peripherals to information pertaining to one or more contexts; and
the pre-stored mapping of peripherals to information pertaining to one or more contexts tags is set based at least in part on an inferred operating behavior using historical information pertaining to use of the terminal by a user of the terminal when the terminal is connected to the peripheral; and
providing, by the application, service information based at least in part on the broadcast context descriptive information, wherein:
the context descriptive information comprises one or more corresponding configurations, settings, or operations of the terminal;
the service information comprises a notification to a user on the terminal of an application associated with the context descriptive information of the terminal; and
the notification comprises a selectable link that, in response to selection by the user, causes the terminal to execute the application related to the context descriptive information of the terminal.

20. The method of claim 1, wherein the one or more operations performed based at least in part on the context information include a control operation for controlling one or more smart home appliances.

21. The method of claim 20, wherein the one or more smart home appliances are different from the peripheral.

22. The method of claim 1, wherein:
the context information is generated and mapped to the peripheral based on historical user behavior; and
the one or more operations are performed in response to the terminal connecting to the peripheral and without a specific user input to control the peripheral that is input after the current connection between terminal and the peripheral.

23. The method of claim 1, wherein the one or more context tags is obtained based at least in part on a pre-stored mapping of peripherals to context tags.

24. The method of claim 1, wherein the inferred operating behavior using historical information pertaining to use of the terminal by a user of the terminal when the terminal is connected to the peripheral comprises a use of the terminal that is inferred based on a determination that the terminal is used in a particular manner a threshold number of times in a particular context of the terminal.

\* \* \* \* \*